United States Patent [19]

Kirchner

[11] 3,953,636

[45] Apr. 27, 1976

[54] METHOD OF IMPROVING IMPACT RESISTANCE OF CERAMIC BODIES, AND IMPROVED BODIES

[75] Inventor: Henry P. Kirchner, Borough of State College, Pa.

[73] Assignee: Ceramic Finishing Company, State College, Pa.

[22] Filed: Apr. 24, 1974

[21] Appl. No.: 463,837

[52] U.S. Cl. ............................ 428/155; 156/89; 264/259; 428/410; 428/426; 428/539
[51] Int. Cl.² .................................. B32B 17/00
[58] Field of Search ............... 161/2, 159, 160, 164, 161/182, 206; 156/89, 77; 117/169 R; 428/218, 410, 420, 426, 539; 264/259

[56] References Cited
UNITED STATES PATENTS

| | | | |
|---|---|---|---|
| 2,943,008 | 6/1960 | Saunders | 161/159 |
| 3,468,750 | 9/1969 | Pfeifer et al. | 161/206 |
| 3,505,158 | 4/1970 | Murray | 161/160 |
| 3,540,915 | 11/1970 | Kirchner | 117/169 R |
| 3,652,378 | 3/1972 | Mistler | 161/182 |
| 3,713,877 | 1/1973 | Kirchner et al. | 117/169 R |

*Primary Examiner*—William J. Van Balen
*Attorney, Agent, or Firm*—Wenderoth, Lind & Ponack

[57] ABSTRACT

A method of improving the impact resistance of bodies of polycrystalline ceramic such as alumina, silicon nitride and silicon carbide, and bodies produced by the method. The body is provided with a layer of a low elastic modulus polycrystalline ceramic material which has microcracks therein, formed by such factors as thermalexpansion coefficient anisotropy, differences in thermalexpansion coefficients between phases of the material, and by changes in volume during phase transformations in the material. The layer can be applied by preforming the layer and then applying, or by hot pressing the material of the layer onto the body.

6 Claims, No Drawings

METHOD OF IMPROVING IMPACT RESISTANCE OF CERAMIC BODIES, AND IMPROVED BODIES

This invention relates to a method of improving the impact resistance of brittle ceramic materials, particularly such materials as alumina, silicon carbide and silicon nitride, by providing thereon a low elastic modulus material with microcracks therein.

BACKGROUND AND PRIOR ART

A principal difficulty with the proposed uses of ceramic materials for such high temperature applications as the stator vanes in aircraft and stationary gas turbines, and rotating parts in automotive gas turbines is their relatively low impact resistance.

Several proposals for increasing this impact resistance have been made, such as improving the quality of the body itself by such means as fiber reinforcement or by forming compressive surface layers on the body which raise the nominal stress at which surface flaws act to cause failure.

While these proposals have been investigated, there have been no reports of outstanding success.

OBJECTS AND SUMMARY OF THE INVENTION

The present invention takes a third approach to improving impact resistance, namely the provision of a particular form of energy absorbing surface layer on the body.

It is known that certain materials have outstanding impact resistance. For example, commercial graphites, if well supported, can be struck a very hard blow without causing more than superficial damage. It is obvious that these materials resist crack propagation in a way that is the direct opposite of the easy crack propagation usually observed in polycrystalline ceramics. It is believed that the impact resistance of graphite is the result of either microcracks formed due to the expansion anisotropy of graphite or the easy basal slip of graphite, or a combination of these properties. There are other low elastic modulus polycrystalline ceramic materials in which localized microcracks occur because of a thermalexpansion anisotropy of individual grains thereof, differences in thermalexpansion coefficients between phases in multiphase polycrystalline ceramic bodies, or changes in volume of the polycrystalline ceramic material during phase transformation thereof.

It is therefore an object of the present invention to utilize the ability of such low elastic modulus materials to withstand impact stresses by virtue of the microcracks therein to improve the impact resistance of ceramic bodies.

It is a further object of the invention to improve the impact resistance of ceramic bodies, particularly of such ceramic materials as alumina, silicon nitride and silicon carbide by coating bodies of such materials with a low elastic modulus polycrystalline ceramic material in which localized microcracks are formed because of (a) the thermalexpansion coefficient anisotropy of individual grains of the polycrystalline ceramic; (b) differences in thermalexpansion coefficients between the phases in multiphase bodies of polycrystalline ceramics; or (c) changes in volume during phase transformations in the polycrystalline ceramic.

It is a still further object to provide bodies of ceramic materials such as alumina, silicon carbide, and silicon nitride which have had the impact resistance improved by coating them with low elastic modulus polycrystalline ceramics in which microcracks are present.

These objects are achieved by the method according to the invention which comprises providing on a body of a polycrystalline ceramic material such as alumina, silicon carbide and silicon nitride, a low elastic modulus polycrystalline ceramic material with microcracks therein. The low elastic modulus polycrystalline ceramic material with the microcracks therein can be a material in which the microcracks are formed because of (a) the thermalexpansion coefficient anisotropy of individual grains of the material; (b) differences in thermalexpansion coefficients between the phases in multiphase bodies of the material; or (c) changes in volume during phase transformations in the material. The coatings can be applied by preparing preformed thin layers of the low elastic modulus polycrystalline ceramic material with microcracks therein and adhering the thin layers to the bodies of polycrystalline material, the impact resistance of which is to be improved. The material can, in some instances, be coated on the body and the body and coating fired to adhere the material to the body. The objects are further achieved by the provision of a body of polycrystalline ceramic material such as alumina, silicon carbide and silicon nitride, which has a surface layer of a low elastic modulus polycrystalline ceramic material thereon, the impact resistance of the body having the surface layer thereon thereby being improved.

DETAILED DESCRIPTION OF THE INVENTION

According to the present invention, energy absorbing surface layers which have microcracks therein are provided on bodies of ceramic material, in particular on bodies of alumina, silicon nitride and silicon carbide ceramics. The surface layer can be provided in different ways. For example, the energy absorbing material can be preformed into a layer and the layer can then be adhered to the body the impact resistance of which is to be improved. The energy absorbing material can, in many instances, be coated onto the body and then fired to secure it to the body. The energy absorbing surface layer is a low elastic modulus material which has the microcracks therein formed in a number of different ways, namely as a result of thermalexpansion coefficient anisotropy, as a result of thermalexpansion coefficient differences between phases, and by phase transformation. Specific low elastic modulus materials which are useful for the energy absorbing surface layer are: aluminum titanate, magnesium dititanate, iron titanate, titania (rutile) $V_2O_5$, coarse-grained alumina, beryllia, β-spodumene, β-encryptite, and boron nitride, in all of which materials microcracks are formed due to thermalexpansion coefficient anisotropy; polyphase compositions of graphite and various carbides, BeO with boron nitride, MgO with tungsten, BeO with silicon carbide, and large-grained silicon carbide in a matrix of fine-grained silicon carbide; and partially stabilized microcracked zirconia. Combinations of the various ceramic bodies and surface layers with microcracks formed by the different ways can be made. One combination is to provide a graphite layer on alumina, the graphite having microcracks formed therein as a result of thermalexpansion coefficient anisotropy. Magnesium dititanate surface layers can be provided on alumina and silicon nitride bodies, the microcracks in the magnesium dititanate being formed as a result of thermalexpansion coefficient anisotropy. Likewise a magnesium dititanate energy absorbing layer can be formed on a silicon carbide body. Silicon carbide-silicon nitride energy absorbing surface layers can be formed on silicon carbide, the microcracks in the surface layer being formed as a result of thermalexpansion differences between these two phases.

It should be pointed out that all of the foregoing low-elastic modulus materials cannot be provided on all of the specific ceramic materials of the bodies by all of the described methods. For example, not all the listed materials can be coated onto the bodies and then fired. As far as is known, however, all the materials can be preformed in thin layers and adhered to the bodies. Moreover, certain of the methods of providing the surface layers may result in a body with improved impact resistance which is not suited for all uses. For example, where a preformed layer of energy absorbing material is adhered to the body which is to have the impact resistance improved by an adhesive which is not heat resistant, the strengthened body will not be suitable for high temperature applications.

The invention will be more specifically disclosed in the following examples. In the examples, the manner of determining the impact resistance and improvements therein was to use a Bell Telephone Laboratores type Carpy impact test machine from Satec Systems, Inc., Grove City, Pa., and from the impact resistance in inch-pounds to calculate the energy in Joules of the impact resistance. In the tables, both the impact resistance in inch-pounds and in Joules is given.

EXAMPLE 1

Three bars of Alsimag 614, 96% alumina, product of American Lava Corporation, having a cross-section 0.25 × 0.25 and 2.25 inches long had applied to the surfaces thereof in the area for impact by the hammer of the testing machine a thin layer of graphite. The thickness of the graphite layer was approximately .04 inches. The areas at the ends of the bars were not coated where they were to come in contact with the specimen supports in the impact testing machine. In this way, the specimens were considered to be relatively rigidly supported in the specimen supports of the testing machines. The graphite was CS-grade graphite, a product of Union Carbide Corporation, and was adhered by cementing the thin layer to the surfaces of the impact bars. The cement was a simple white rubber cement sold by Union Rubber and Asbestos Co. Control bars of the same alumina were prepared in the same manner. The impact resistance for both the control bars and the improved bars was determined by testing in the testing machine, and was as given in Table I. It will be seen that the impact resistance is increased some 2½ times by the provision of the graphite energy absorbing coating.

EXAMPLE 2

Three bars of the same type of alumina as in Example 1 were prepared in the same manner as in Example 1, and had applied to the surfaces in the same manner as in Example 1 a layer of magnesium dititanate having a grain size of 15$\mu$m and a modulus of elasticity E $\cong$ 7×10$^6$ psi. The impact resistance of the thus coated bars was determined as in Example 1, and the results were as shown in Table I. It will be seen that the impact resistance was increased threefold.

EXAMPLE 3

Four bars of silicon nitride, a product of Norton Company, Worcester, Massachusetts, the same size as the alumina bars described above in connection with Example 1 were prepared, and two of the bars were coated with magnesium dititanate having a grain size of about 15$\mu$m and having an elastic modulus of about 7 × 10$^6$ psi. The coatings were applied by cementing them to the bars in the area of the impact by the hammer of the testing apparatus, the ends of the bars being uncoated as with the alumina bars in the preceding Examples.

The coated bars were tested in the impact testing machine along with the two remaining uncoated bars which served as control bars, and the average impact resistance was as shown in Table 1.

It is noted that in the first test attempt, using a 1 foot pound hammer in the testing machine, the coated silicon nitride bars failed to fracture. The bar coatings, which had been damaged by the impact of the hammer of the testing machine, were removed and the bars were again coated in the same manner, and the specimens were retested using a two foot pound hammer. Again, the specimens failed to fracture. This is the significance of the indication that the impact resistance is greater than the figures shown in Table I.

EXAMPLE 4

Bars of Norton HS-130 silicon nitride, a product of Norton Co., Worcester, Massachusetts, having a size 6.4 × 6.4 × 57 mm. were prepared. Thin plates of magnesium dititanate were cemented to the surfaces of the bars at the impact point, with the same cement as in the preceding examples, the ends of the bars being left uncoated so that they were rigidly mounted in the testing machine. The magnesium dititanate in plate form was prepared as follows.

Plates of magnesium dititanate were cut from specimens supplied by Professor R. C. Bradt of The Pennsylvania State University. One specimen had a grain size of 5$\mu$m, and the other specimen had a grain size of 15$\mu$m. One set of three plates cut from the magnesium dititanate specimen having the 15$\mu$m grain size had thicknesses of 0.97 mm, 1.21 mm and 1.35 mm, respectively. These plates were cemented to those bars to form specimens JSP-1-1 to 1-3. A second group of plates was cut from the specimen having the 5$\mu$m grain size, these plates having a thickness of about 0.75 mm. These plates were likewise cemented to three silicon nitride bars in the same manner as described above to form specimens JSP-2-1 to 2-3.

The thus prepared coated silicon nitride bars were tested for impact resistance with the results shown in Table II. It will be seen that, as compared with the impact resistance of the uncoated control bars, the impact resistance for all of the coated bars was greater than three times the impact resistance of the uncoated bars.

It is noted that none of the coated bars were fractured in the testing apparatus, therefore indicating that all of them had an impact resistance strength of greater than 12 inch-pounds and greater than 1.36 Joules. Thus, the improvement in impact resistance can, in some instances, be considered to be greater than a three-fold improvement.

EXAMPLE 5

Silicon nitride bars having the same size as in Example 4 were prepared from AVCO silicon nitride, and groups of three bars had cemented to them, in the same manner as described above for Example 4, plates of magnesium dititanate having the 5 $\mu$m grain size and the 15 $\mu$m grain size, and having various thicknesses as shown in Table III. These specimens JS-34-5A-5F and JS-34-15A-15F were also tested in the impact resistance apparatus, this time using a 2 foot pound hammer instead of a one foot pound hammer in order to insure fracture of the specimens.

The impact resistance of the various specimens, as well as the control bars JS-34-C1 to C3 which were also tested, was as shown in Table III. It will be seen that in all instances the impact resistances of the specimens were substantially higher than the impact resistance of the controls, and that the amount of improvement increased with increasing thickness of the plates. No definite effect of grain size of the plates was observed.

EXAMPLE 6

Flat plates of silicon carbide, Norton NC-203 silicon carbide, a product of The Norton Company, Worcester, Mass., were prepared and were coated with a layer of a mixture of 80% by weight silicon nitride and 20% by weight silicon carbide, with 5% MgO added. The silicon nitride was Hermann C. Stark, Berlin silicon nitride having a 1.05 $\mu$m grain size. The silicon nitride powder was 400 mesh silicon carbide of the Norton Company, Worcester, Mass., and the MgO was added as $MgCO_3$. The powders were mixed by milling with T-butanol in an alumina mill with alumina balls for about 1 hour and were dried at 360°K. in a vacuum oven.

The layer of silicon nitride and silicon carbide was hot pressed on the slab of silicon carbide at 1773°K. and 13.8 $MNm^{-2}$ for 1 hour to produce a layer of silicon carbide 0.83 mm thick which was strongly adhered to the slab.

Test bars GB-18-1 to 4 were cut from the slab which were 6.4 × 6.4 × 57 mm (0.25 × 0.25 × 2.25 inches), and were placed in the test apparatus with the coated surface in the position to receive the impact.

The impact resistances thereof, as well as the impact resistances of the control specimens JS-31-1 to 3, were measured by the impact testing apparatus with the results as shown in Table IV. It will be seen that, as in the preceding Examples, the increase in impact resistance was in the range of 2½ to 3 times that of the controls.

TABLE I

IMPACT RESISTANCE OF COATED CERAMICS

| Example | Ceramic Body | Coating | No. Specimens | Average Impact Resistance Foot Pounds |
|---|---|---|---|---|
|  | 96% Alumina | None (controls) | 3 | 0.21 |
| 1. | 96% Alumina | Graphite | 3 | 0.56 |
| 2. | 96% Alumina | Magnesium Dititanate | 3 | 0.63 |
|  | Silicon Nitride | None (controls) | 2 | 0.37 |
| 3. | Silicon Nitride | Magnesium Dititanate | 2 | >1.0 |
| 3. | Silicon Nitride | Magnesium Dititanate | 2 | >2.0 |

TABLE II

IMPACT RESISTANCE OF NORTON HS-130 SILICON NITRIDE BARS WITH CEMENTED PLATES OF MAGNESIUM DITITANATE (6.4 × 6.4 × 57 mm bars)

| Specimen No. | Treatment | Layer Thickness mm | Room Temp Impact Resistance[1] Joules in. lbs. | |
|---|---|---|---|---|
| JSP-1-C1 | Control | none | 0.60 | 5.3 |
| JSP-2-C1 | " | " | 0.32 | 2.8 |
|  |  | Average | 0.46 | 4.1 |
| JSP-1-1 | 15 $\mu$m $MgTi_2O_5$ | 0.97 | >1.36 | >12 |
| JSP-1-2 | " | 1.21 | >1.36 | >12 |
| JSP-1-3 | " | 1.35 | >1.36 | >12 |
|  |  | Average | >1.36 | >12 |
| JSP-2-1 | 5 $\mu$m $MgTi_2O_5$ | 0.73 | >1.36 | >12 |
| JSP-2-2 | " | 0.75 | >1.36 | >12 |
| JSP-2-3 | " | 0.77 | >1.36 | >12 |
|  |  | Average | >1.36 | >12 |

[1]one foot pound hammer

TABLE III

IMPACT RESISTANCE OF AVCO SILICON NITRIDE BARS WITH CEMENTED PLATES OF MAGNESIUM DITITANATE (6.4 × 6.4 × 57 mm bars)

| Specimen No. | Treatment | Layer Thickness mm | Room Temp Impact Resistance[1] Joules in.lbs. | |
|---|---|---|---|---|
| JS-34 -C1 | Control | — | 0.42 | 3.8 |
| -C2 | " | — | 0.26 | 2.3 |
| -C3 | " | — | 0.34 | 3.0 |
|  | Average | — | 0.34 | 3.0 |
| JS-34 -5A | 5 $\mu$m $MgTi_2O_5$ | 1.25 | 1.07 | 9.5 |
| -5B | " | 1.31 | 1.15 | 10.2 |
| -5C | " | 1.34 | 2.38 | 21.1 |
|  | Average | 1.30 | 1.53 | 13.6 |
| JS-34 -5D | 5 $\mu$m $MgTi_2O_5$ | 0.54 | 0.46 | 4.1 |
| -5E | " | 0.58 | 0.47 | 4.2 |
| -5F | " | 0.63 | 0.41 | 3.6 |
|  | Average | 0.58 | 0.45 | 4.0 |
| JS-34 -15A | 15 $\mu$m $MgTi_2O_5$ | 1.12 | 1.24 | 11.0 |
| -15B | " | 1.07 | 1.28 | 11.3 |
| -15C | " | 0.91 | 1.24 | 11.0 |
|  | Average | 1.03 | 1.25 | 11.1 |
| JS-34 -15D | 15 $\mu$m $MgTi_2O_5$ | 0.26 | 0.35 | 3.1 |
| -15E | " | 0.31 | 0.43 | 3.8 |
| -15F | " | 0.44 | 0.64 | 5.7 |
|  | Average | 0.34 | 0.47 | 4.2 |

[1]two foot pound hammer

TABLE IV

IMPACT RESISTANCE OF NORTON NC-203 SILICON CARBIDE WITH HOT PRESSED $Si_3N_4$ - SiC SURFACE LAYERS

| Specimen No. | Treatment | Layer Thickness mm | Room Temp Impact Resistance[1] Joules in.lbs. | | Mirror Radius $\mu$m | Comments |
|---|---|---|---|---|---|---|
| JS-31 -1 | As machined control | — | 0.21 | 1.9 | — | |
| -2 | " | — | 0.20 | 1.8 | — | |
| -3 | " | — | 0.26 | 2.3 | — | |
| | Average | — | 0.22 | 2.0 | | |
| GB-18 -1 | Hot pressed $Si_3N_4$-SiC | 0.36 | 0.47 | 4.1 | 150 | Break at center, origin at edge, poor mirror |
| -2 | " | 0.39[2] | 0.77 | 6.8 | — | 3 breaks at center, origin at corner |
| -3 | " | 0.40[2] | 0.51 | 4.5 | — | 3 breaks at center, origin at corner |
| -4 | " | 0.37 | 0.81 | 7.2 | — | 3 breaks at center, origin at corner, poor mirror |
| | Average | 0.38 | 0.64 | 5.7 | | |

[1] one foot pound hammer
[2] flawed

What is claimed is:

1. A polycrystalline ceramic body having improved impact resistance, said body having adhered thereto a layer of low elastic modulus polycrystalline ceramic material having microcracks therein.

2. A polycrystalline ceramic body as claimed in claim 1 in which the low elastic modulus material is a material in which the individual grains have a thermalexpansion coefficient anisotropy, the microcracks having been formed therein by heating.

3. A polycrystalline ceramic body as claimed in claim 1 in which the low elastic modulus material is a multiphase material having differences in thermalexpansion coefficients between phases, the microcracks having been formed therein by heating.

4. A polycrystalline ceramic body as claimed in claim 1 in which the low elastic modulus material is a material having different phases with different volumes, the microcracks having been formed therein by changes in volume during phase transformations in the material.

5. A polycrystalline ceramic body as claimed in claim 1 in which the polycrystalline ceramic material is a material taken from the group consisting of alumina, silicon carbide and silicon nitride, and the low elastic modulus material is at least one material taken from the group consisting of aluminum titanate, magnesium dititanate, iron titanate, titania (rutile) $V_2O_5$, coarse-grained alumina, beryllia, $\beta$-spodumene, $\beta$-encryptite, boron nitride; polyphase compositions of graphite and various carbides, BeO with boron nitride, MgO with tungsten, BeO with silicon carbide, large-grained silicon carbide in a matrix of fine-grained silicon carbide; and partially stabilized microcracked zirconia.

6. A polycrystalline ceramic body as claimed in claim 1 in which the polycrystalline ceramic material is silicon carbide and the low elastic modulus material is a mixture of silicon nitride and silicon carbide.

* * * * *